(12) United States Patent
Woo et al.

(10) Patent No.: US 9,053,560 B2
(45) Date of Patent: Jun. 9, 2015

(54) EDGE MANAGEMENT UNIT FOR 2-DIMENSION VECTOR GRAPHICS, GRAPHIC PROCESSING APPARATUS AND METHOD THEREOF

(75) Inventors: Hyunjae Woo, Suwon-si (KR); Yeon-Ho Im, Suwon-si (KR); Yongkwon Cho, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 587 days.

(21) Appl. No.: 13/348,359

(22) Filed: Jan. 11, 2012

(65) Prior Publication Data
US 2012/0200584 A1    Aug. 9, 2012

(30) Foreign Application Priority Data

Feb. 7, 2011    (KR) ........................ 10-2011-0010727

(51) Int. Cl.
*G06F 12/02*    (2006.01)
*G06T 1/60*    (2006.01)
*G06T 11/20*    (2006.01)

(52) U.S. Cl.
CPC .................. *G06T 1/60* (2013.01); *G06T 11/203* (2013.01)

(58) Field of Classification Search
CPC ........ G06T 1/60; G06F 12/023; G09G 5/363; G09G 5/393; G09G 5/14
See application file for complete search history.

(56) References Cited

U.S. PATENT DOCUMENTS

| 5,016,189 | A | * | 5/1991 | Yamada | 345/623 |
|---|---|---|---|---|---|
| 5,353,394 | A | * | 10/1994 | Kubota | 345/441 |
| 5,808,617 | A | * | 9/1998 | Kenworthy et al. | 345/421 |
| 2002/0154134 | A1 | * | 10/2002 | Matsui | 345/582 |
| 2005/0065263 | A1 |  | 3/2005 | Chung et al. |  |
| 2005/0264574 | A1 | * | 12/2005 | Shimomura et al. | 345/531 |

FOREIGN PATENT DOCUMENTS

| JP | 200584798 A | 3/2005 |
|---|---|---|
| KR | 20090105643 A | 10/2009 |
| KR | 20100052850 A | 5/2010 |
| KR | 20100066165 A | 6/2010 |

* cited by examiner

*Primary Examiner* — Ulka Chauhan
*Assistant Examiner* — Saptarshi Mazumder
(74) *Attorney, Agent, or Firm* — Harness, Dickey & Pierce, PLC.

(57) ABSTRACT

Disclosed is an edge management unit of accessing a memory including a first memory area and a second memory area. The edge management unit comprises an edge write controller writing bucket information corresponding to input edge data in the first memory area and the edge data at a location of the second memory area appointed by the bucket information; and an edge read controller responding to a scan line signal to read the bucket information from the first memory area and the edge data from a location of the second memory area appointed by the read bucket information.

3 Claims, 12 Drawing Sheets

EDGE MANAGEMENT UNIT FOR 2-DIMENSION VECTOR GRAPHICS, GRAPHIC PROCESSING APPARATUS AND METHOD THEREOF

CROSS-REFERENCE TO RELATED APPLICATIONS

This application claims the benefits, under 35 U.S.C §119, of Korean Patent Application No. 10-2011-0010727 filed Feb. 7, 2011, in the Korean Intellectual Property Office (KIPO), the entirety of which is incorporated by reference herein.

BACKGROUND

1. Field

Exemplary embodiments relate to a graphic processing apparatus for 2-dimension vector graphics.

2. Description of the Related Art

Vector graphics is the creation of digital images through a sequence of commands or mathematical statements that place lines and shapes in a given two-dimensional or three-dimensional space. In physics, a vector is a representation of both a quantity and a direction at the same time. In vector graphics, the file that results from a graphic artist's work is created and saved as a sequence of vector statements. For example, instead of containing a bit in the file for each bit of a line drawing, a vector graphic file describes a series of points to be connected. One result is a much smaller file.

At some point, a vector image is converted into a raster graphics image, which maps bits directly to a display space (and is sometimes called a bitmap). The vector image can be converted to a raster image file prior to its display so that it can be ported between systems.

SUMMARY

According to at least one example embodiment, an edge management unit may access a memory which may include a first memory area and a second memory area. The edge management unit comprises an edge write controller writing bucket information corresponding to input edge data in the first memory area and the edge data at a location of the second memory area appointed by the bucket information; and an edge read controller responding to a scan line signal to read the bucket information from the first memory area and the edge data from a location of the second memory area appointed by the read bucket information.

According to at least one example embodiment, a graphic processing apparatus may include a memory including a first memory area and a second memory area; an edge write controller writing bucket information corresponding to input edge data in the first memory area and the edge data at a location of the second memory area appointed by the bucket information; an edge read controller responding to a scan line signal to read the bucket information from the first memory area and the edge data from a location of the second memory area appointed by the read bucket information; and a rasterizer outputting the scan line signal and converting edge data read by the edge read controller into a raster image. In this embodiment, the rasterizer includes a buffer for storing the edge data and deletes invalid edge data from the buffer.

According to at least one example embodiment, an edge management method may include receiving edge data; searching a minimum point of the edge data; and writing bucket information corresponding to the minimum point in a first memory and the edge data at a location of a second memory appointed by the bucket information.

In this embodiment, the second memory includes a plurality of bucket areas, and the bucket information includes a bucket ID appointing at least one of the plurality of bucket areas of the second memory and an edge count indicating the number of edge data stored in the appointed bucket area.

In this embodiment, the edge management method further comprises receiving a scan line signal; reading a bucket ID and an edge count corresponding to the scan line signal from the first memory; and reading the edge data from a location of the second memory appointed by the bucket ID when the edge count is not '0'.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
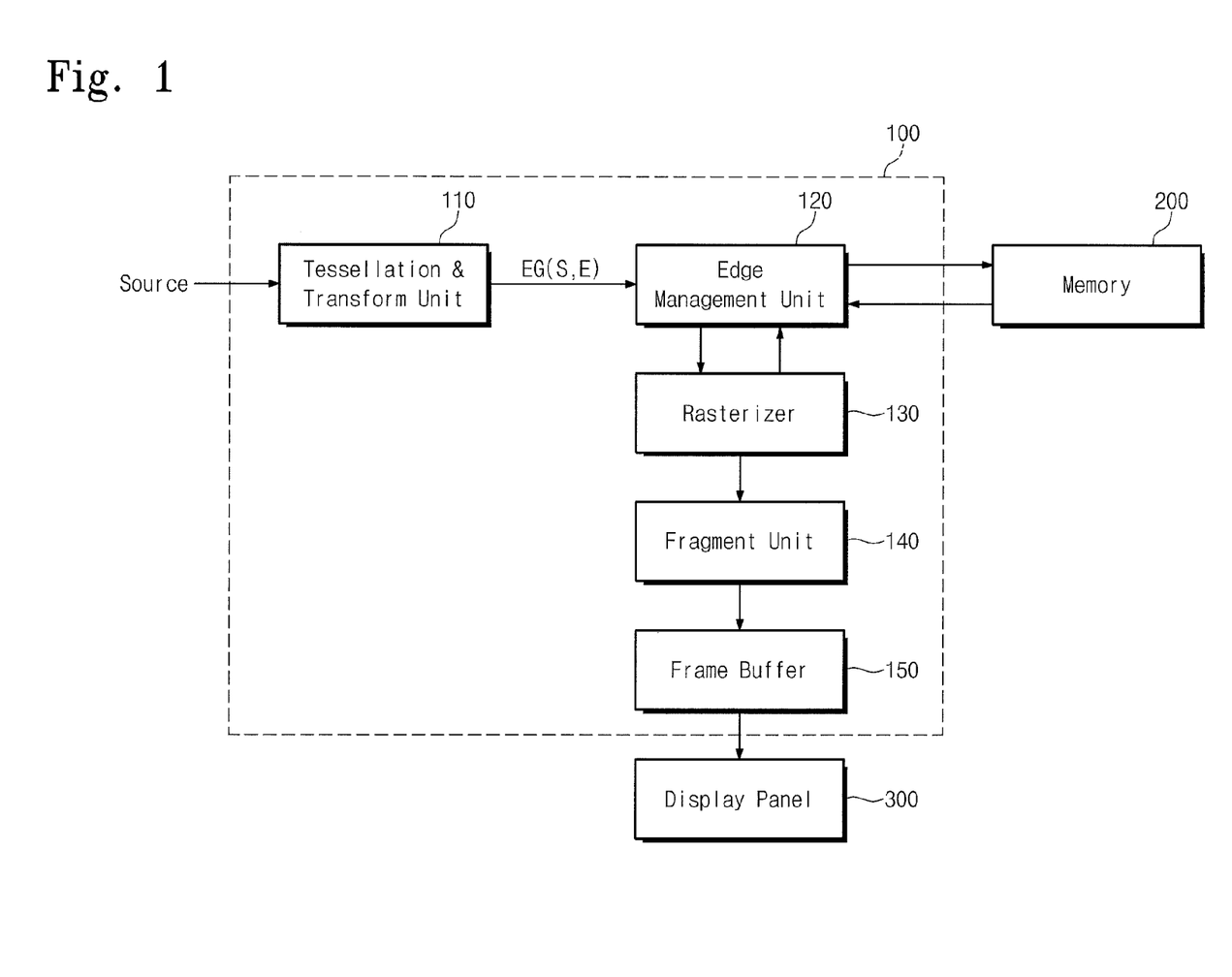
FIG. 1 is a block diagram of a graphic processing apparatus according to at least one example embodiment.

FIG. 1 is a block diagram of a graphic processing apparatus according to at least one example embodiment.

Referring to FIG. 1, a graphic processing apparatus 100 may be electrically connected with a memory 200 and a display panel 300. The graphic processing apparatus 100 may be configured to store bucket information needed to process edge information in the memory 200 or to read bucket information and edge data from the memory 200. The graphic processing apparatus 100 may be configured to provide an image signal to the display panel 300 according to the bucket information and edge data read out from the memory 200.

According to at least one example embodiment, the graphic processing apparatus 100 includes a tessellation and transform unit 110, an edge management unit 120, a rasterizer 130, a fragment unit 140, and a frame buffer 150. The tessellation and transform unit 110 may be configured to receive an image signal from an external graphic source, to split a surface of an object into polygons from the received image signal, and to extract edge data of the split polygons. The extracted edge data EG(S, E) may include an edge coordinate of a straight line connecting two dots. In the edge coordinate EG(S, E), 'S' may represent a coordinate (px1, py1) of a start point of the straight line, and 'E' may represent a coordinate (px2, py2) of an end point of the straight line. That is, the edge coordinate may be expressed by ((px1, py1), (px2, py2)). The edge data EG(S, E) may be provided to the edge management unit 120.

The edge management unit 120 may generate bucket information corresponding to edge data EG(S, E) received during a write mode and store the bucket information and the edge data EG(S, E) in the memory 200. During a read mode, the edge management unit 120 may read bucket information from the memory 200. The edge management unit 120 may read edge data EG(S, E) from the memory 200 according to the read bucket information.

The rasterizer 130 may convert the edge data EG(S, E) read by the edge management unit 120 into a raster image. The fragment unit 140 may perform various operations (e.g., texture mapping, fogging, alpha test, stencil test, blending, dithering, and so on) on the raster image and store image data in the frame buffer 150. Image data stored in the frame buffer 150 may be displayed through the display panel 300.

Figure 2:
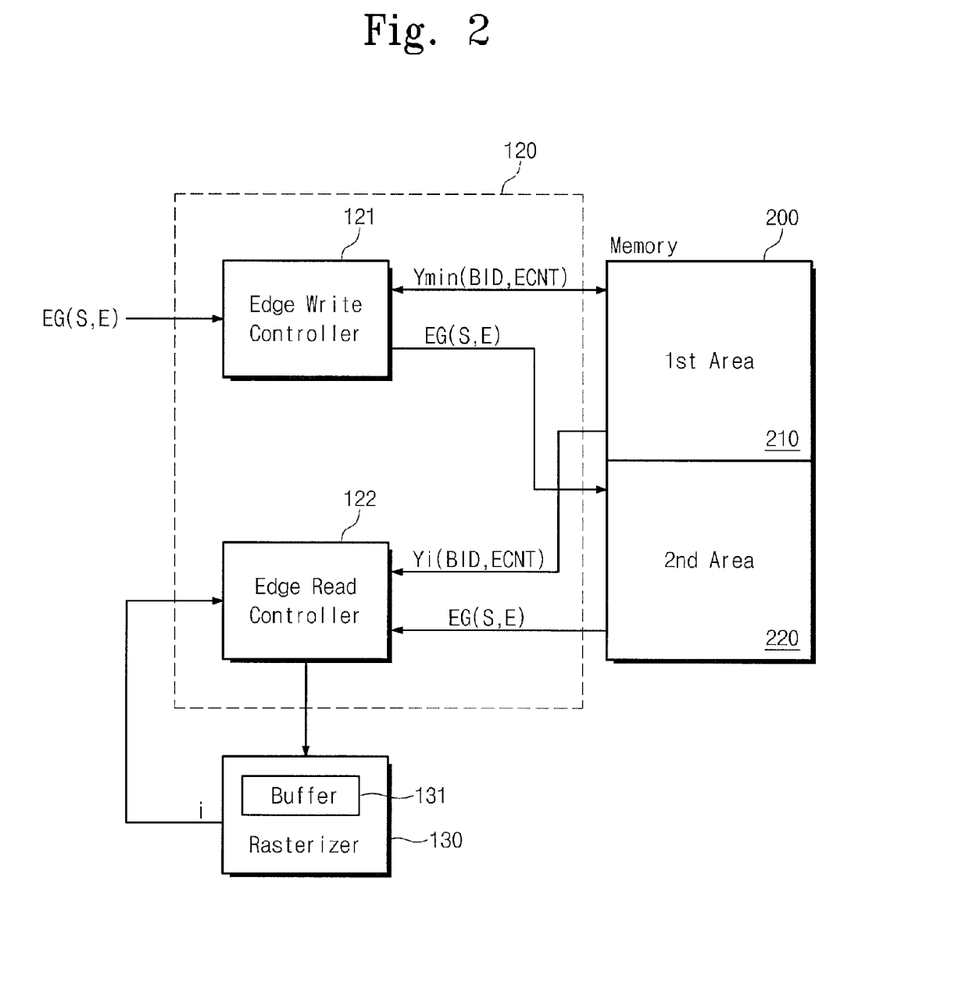
FIG. 2 is a block diagram of an edge management unit illustrated in FIG. 1.

FIG. 2 is a block diagram of an edge management unit illustrated in FIG. 1.

Referring to FIG. 2, an edge management unit 120 may include an edge write controller 121 and an edge read controller 122. The edge write controller 121 may receive edge data EG(S, E) from a tessellation and transform unit 110 in FIG. 1 and generate bucket information Ymin(BID, ECNT) corresponding to the edge data EG(S, E), where the value 'BID' represents a bucket identifier and the value 'ECNT' represents an edge count. The edge write controller 121 may store the bucket information Ymin(BID, ECNT) at the first memory area 210 of the memory 200. Further, the edge write controller 121 may store the edge data EG(S, E) at a location of the second memory area 220 of the memory 200 designated by the bucket information Ymin(BID, ECNT).

The edge read controller 122 may read bucket information Yi(BID, ECNT) from the first memory area 210 of the memory 200 in response to a scan line signal (i) from a rasterizer 130. Further, the edge read controller 122 may read edge data EG(S, E) from a location of the second memory area 220 of the memory 200 designated by the read bucket information Yi(BID, ECNT).

The memory 200 may include the first memory area 210 and the second memory area 220. The memory 200 may further include other memory areas other than the first and second memory areas 210 and 220.

The rasterizer 130 may output the scan line signal (i). The rasterizer 130 may sequentially output scan line signals (i) each corresponding to a plurality of scan lines of a display panel 300 in FIG. 1.

Figure 3:
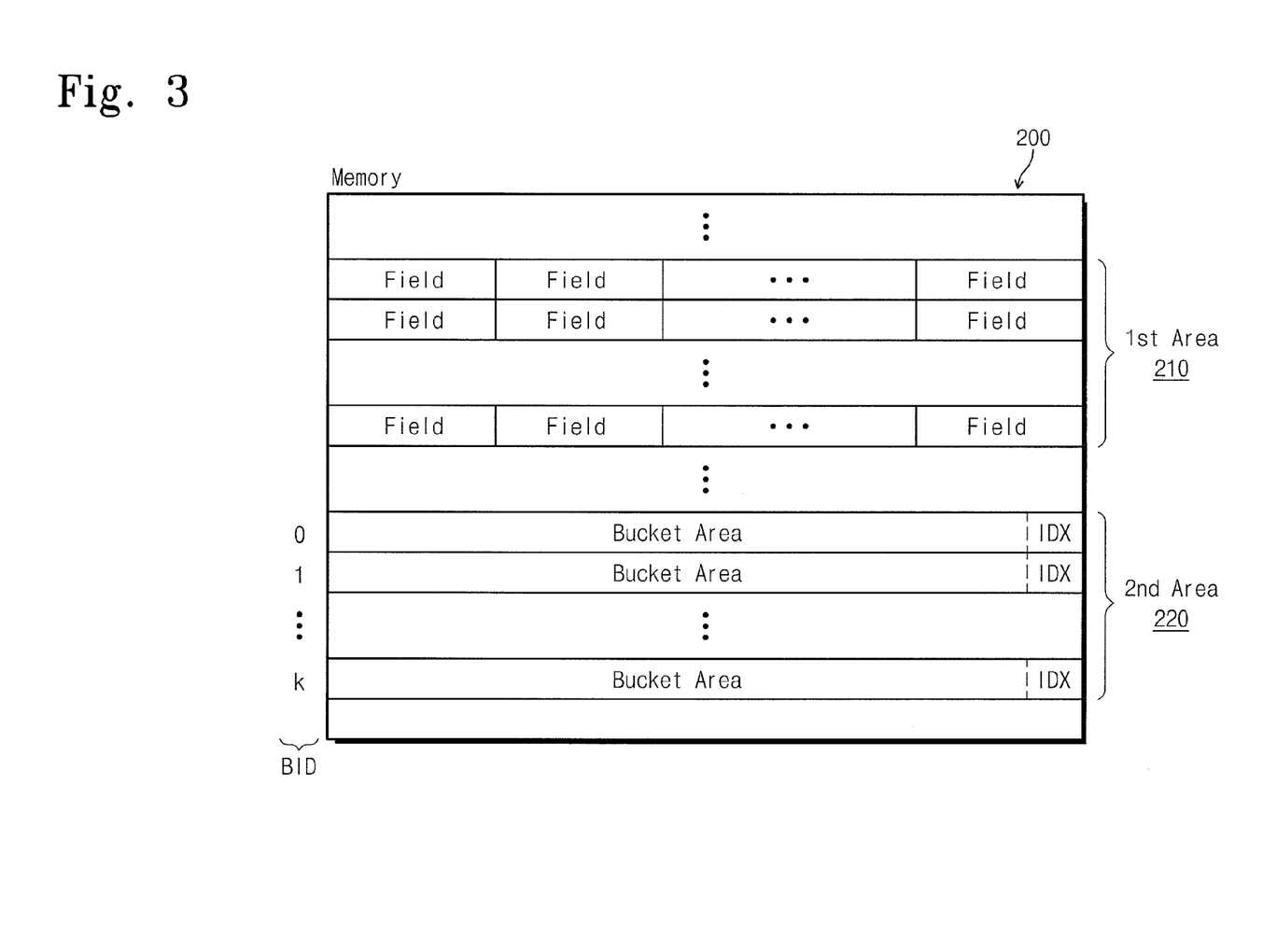
FIG. 3 is a diagram showing the first and second areas of a memory illustrated in FIG. 2.

FIG. 3 is a diagram showing the first and second areas of a memory illustrated in FIG. 2.

Referring to FIG. 3, a memory 200 may include the first memory area 210 and the second memory area 220. The first memory area 210 of the memory 200 may include a plurality of fields.

The second memory area 220 of the memory 200 may include a plurality of bucket areas, each of which can be accessed by a bucket ID BID. The bucket areas may store a plurality of edge data and an index IDS, respectively.

Figure 4A:
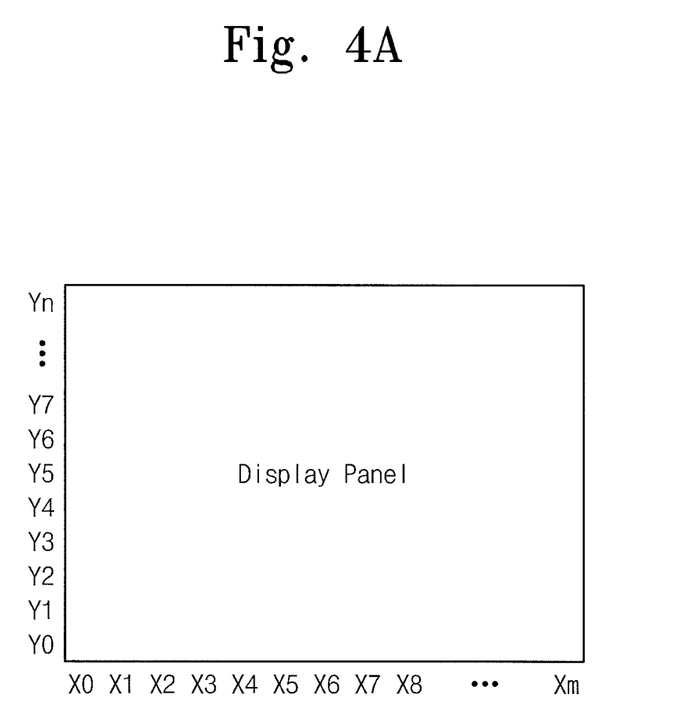
FIG. 4A is a diagram showing scan lines of a display panel illustrated in FIG. 1.
Figure 4B:
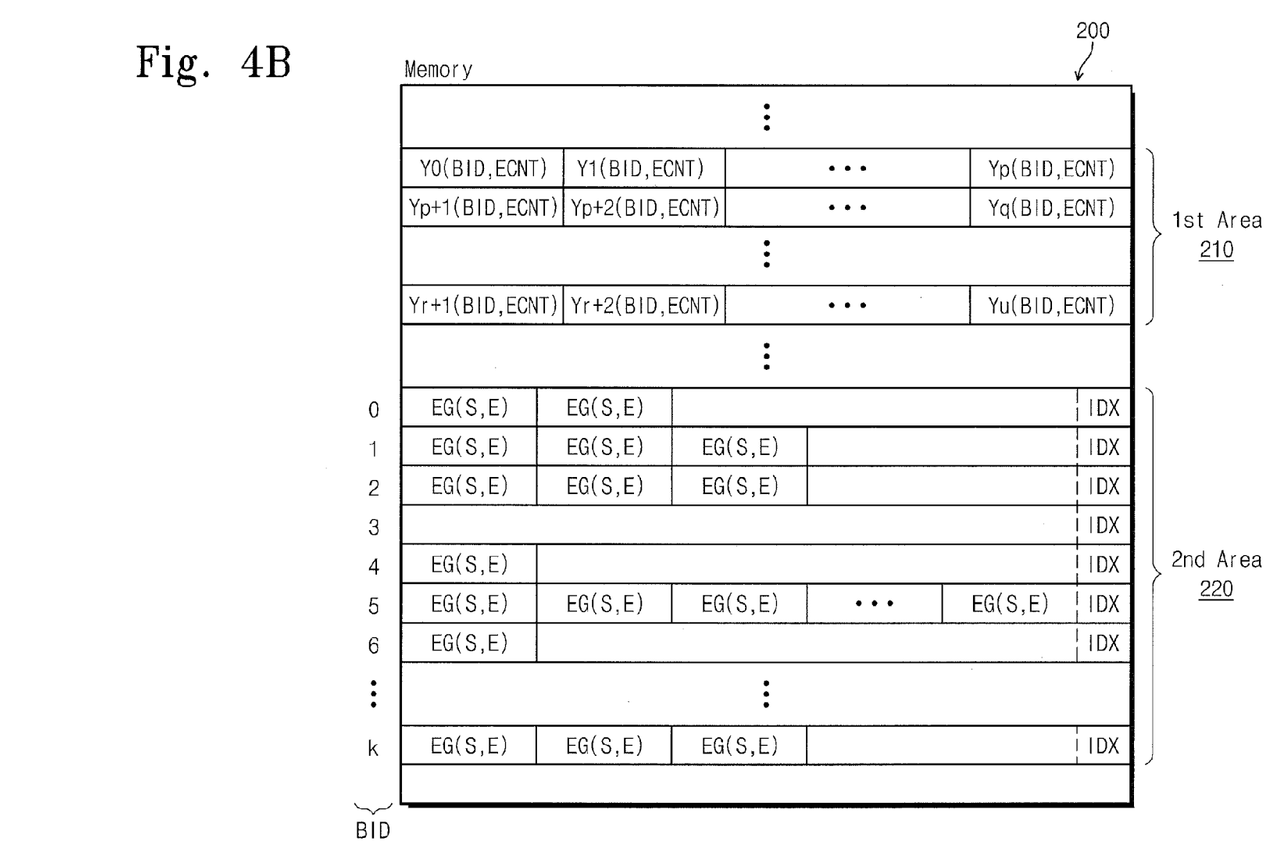
FIG. 4B is a diagram showing the correspondence between scan lines of a display panel in FIG. 4A and the first and second memory areas of a memory illustrated in FIG. 2.

FIG. 4A is a diagram showing scan lines of a display panel illustrated in FIG. 1, and FIG. 4B is a diagram showing the correspondence between scan lines of a display panel in FIG. 4A and the first and second memory areas of a memory illustrated in FIG. 2.

Referring to FIG. 4A, a display panel 300 may include a plurality of pixels (not shown) arranged in a plurality of rows and a plurality of columns. A coordinate of a pixel at an intersection of an X axis and a Y axis may be P(X, Y).

Referring to FIG. 4B, a plurality of fields in the first memory area 210 may correspond to the Y axis of the display panel 300, that is, scan lines Y0 to Yn, respectively. Below, the Y-axis coordinate of the display panel 300 may be called a scan line. Each of the plurality of fields may store bucket information (BID, ECNT) on edge data placed at a corresponding scan line. For example, bucket information of a scan line Y0 may be represented by Y0(BID, ECNT). That is, the bucket information may include a bucket ID BID designating a bucket area of the second memory area 220 and an edge count ECNT being a coordinate number stored at a bucket area of the second memory area 220.

Each of a plurality of bucket areas in the second memory area 220 of the memory 200 may store edge data EG(S, E). A plurality of edge data EG(S, E) stored at one bucket area may be coordinates of edges whose lowest points are identical to one another. That is, a plurality of edge data EG(S, E) on the same scan line may be bound by a bucket so as to be stored in the same bucket area in the second memory area 220 of the memory 200.

In this embodiment, each bucket area within the second memory area 220 of the memory 200 may be accessed by a bucket ID BID. One bucket area may store maximum L edge data EG(S, E). Each of the bucket areas may further comprise an index IDX. The index IDX may designate another bucket area where a plurality of edge data EG(S, E) on the same scan line is stored. The index IDX may be used to link plural bucket areas when the number of edge data EG(S, E) on the same scan line is more than a maximum storable number Q of a bucket area.

Figure 5A:
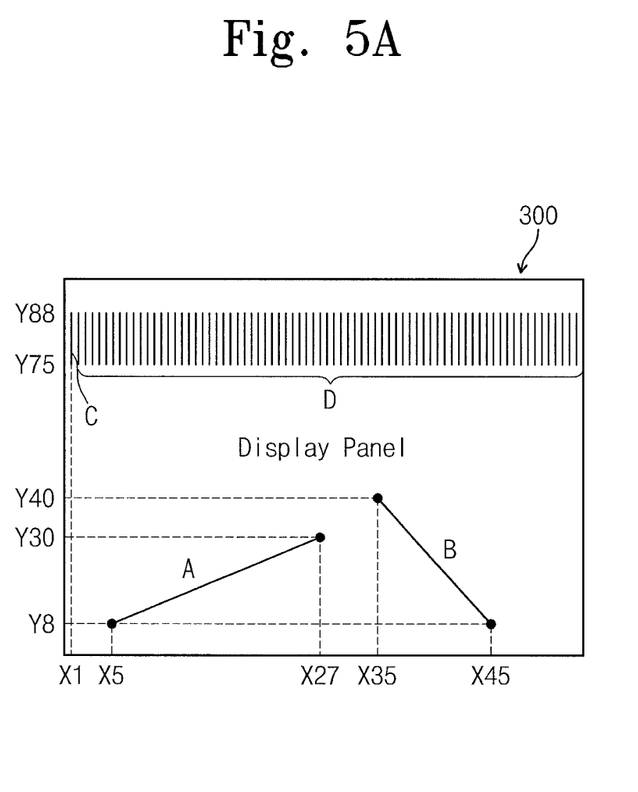
FIG. 5A is a diagram showing an image displayed on a display panel.
Figure 5B:
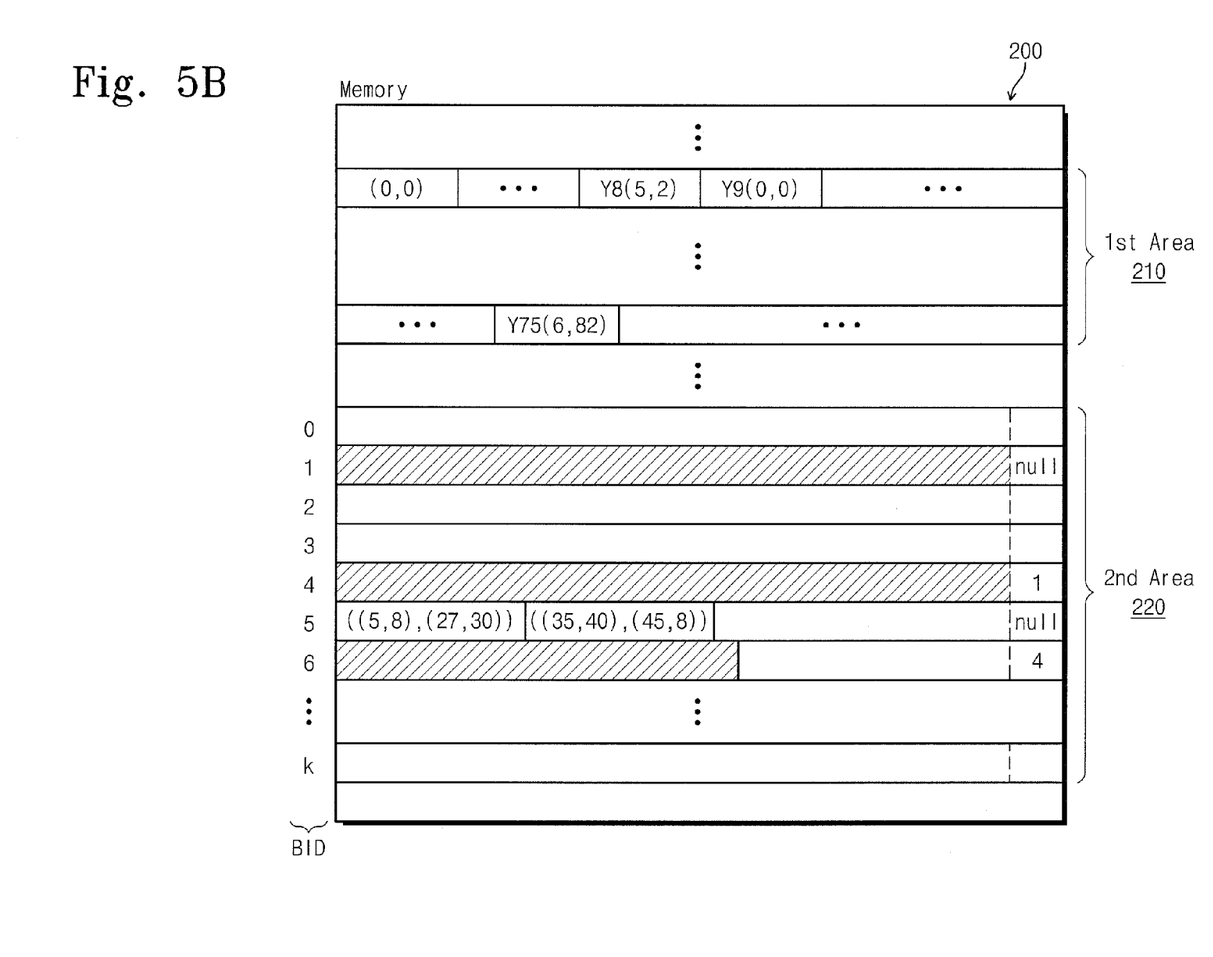
FIG. 5B is a diagram showing bucket information and edge information stored in a memory according to an image illustrated in FIG. 5A.

FIG. 5A is a diagram showing an image displayed on a display panel, and FIG. 5B is a diagram showing bucket information and edge information stored in a memory according to an image illustrated in FIG. 5A. Below, an operation of an edge management unit 120 in FIG. 2 will be more fully described with reference to FIGS. 2 and 5B.

Referring to FIGS. 2, 5A and 5B, a plurality of straight lines may be displayed on a display panel 300. A tessellation and transform unit 110 may sequentially output edge data EG((5, 8), (27, 30)) on a straight line A, edge data EG(35, 40), (45, 8)) on a straight line B, edge data EG((1, 75), (1, 88)) on a straight line C, and edge data on a straight line D. Y-axis coordinates of edge data on the straight lines D may be identical to edge data of the straight line C, while X-axis coordinates thereof may be different from one another. It is assumed that the number of the straight lines D is 81.

An edge write controller 121 may receive edge data EG(S, E) from the tessellation and transform unit 110. In general, edge data EG(S, E) may be received randomly.

Initially, an edge count ECNT in each field of the first memory area 210 may be set to '0'. Afterwards, the edge write controller 121 may generate bucket information corresponding to received edge data EG(S, E), that is, a bucket ID BID and an edge count ECNT and store the bucket ID BID and the edge count ECNT in a memory 200.

When a set of edge data EG(S, E) corresponding to an image in FIG. 5B is received, the following bucket information and edge data may be stored in the memory 200 under the control of the edge write controller 121. First of all, since no edges exist on scan lines Y0 to Y7, edge counts ECNT corresponding to scan lines Y0 to Y7 in the first memory area 210 of the memory 200 may be maintained at '0'. At this time, a bucket ID corresponding to a scan line not including any edge may be set to '0' or a predetermined value.

For example, it is assumed that edge data on the straight line A is firstly received and edge data on the straight line B is secondly received. If the edge data on the straight line A is received, the edge write controller 121 may search a minimum point Ymin of a scan line among edge data EG(5, 8), (27, 30). In edge data EG((px1, py1),(px2, py2)), a minimum point Ymin may be py1 when py1 is less than py2 and py2 when py1 is more than py2. In an exemplary embodiment in FIG. 5A, a minimum point Ymin of edge data EG(5, 8), (27, 30) may be 8.

The edge write controller 121 may read bucket information Y8(BID, ECNT) from a field corresponding to the 8th scan line Y8 of the first memory area 210. The edge write controller 121 may judge whether the read edge count ECNT is less than a maximum storable number of each bucket area of the second memory area 220. It is assumed that the maximum storable number of each bucket area of the second memory area 220 is 31. However, according to at least one example embodiment, the maximum storable number of each bucket area of the second memory area 220 may be a value more or less than 31. Since the read edge count ECNT is 0, it is possible to store edge data at a location designated by a bucket ID BID.

Since an edge count ECNT is '0', the edge write controller 121 may set a new bucket ID BID designating an empty bucket area of the second memory area 220 and increase the edge count ECNT of a field corresponding to the 8th scan line among fields within the first memory area 210 by 1. The edge write controller 121 may store bucket information Y0(BID, ECNT) at a field corresponding to the 8th scan line among fields within the first memory area 210. Further, the edge write controller 121 may store edge data EG((35, 40), (45, 8)) at a location of the second memory area 220 appointed by a bucket ID BID.

If edge data on the straight line B is received, the edge write controller 121 may search a minimum point Ymin of a scan line among edge data EG((35, 40), (45, 8)). A minimum point Ymin of the edge data EG((35, 40), (45, 8)) on the straight line B may be 8.

The edge write controller 121 may read bucket information Y8(BID, ECNT) from a field corresponding to the 8th scan line Y8 of the first memory area 210. The edge write controller 121 may judge whether the read edge count ECNT is less than a maximum storable number of each bucket area of the second memory area 220. Since a maximum storable number of each bucket area of the second memory area 220 is 31 and the read edge count ECNT is 1, edge data may be stored further in a location appointed by the bucket ID BID.

The edge write controller 121 may increase an edge count ECNT of a field corresponding to the 8th scan line among fields within the first memory area 210 by 1. Further, the edge write controller 121 may store edge data EG((35, 40), (45, 8)) at a location of the second memory area 220 appointed by the read bucket ID BID.

If edge data on the straight line C is received, the edge write controller 121 may search a minimum point Ymin of a scan line among edge data EG((1, 75), (1, 88)). A minimum point Ymin of the edge data EG((1, 75), (1, 88)) on the straight line C may be 75.

The edge write controller 121 may read bucket information Y75(BID, ECNT) from a field corresponding to the 75th scan line Y75 of the first memory area 210. Since the read edge count ECNT is 0, the edge write controller 121 may set a bucket ID BID, appointing an empty bucket area of the second memory area 220, to 1. Further, the edge write controller 121 may increase an edge count ECNT of a field corresponding to the 75th scan line Y75 among fields within the first memory area 210 by 1. The edge write controller 121 may store bucket information Y75(BID, ECNT) at a field corresponding to the 75th scan line Y75 among fields within the first memory area 210. The edge write controller 121 may store edge data EG((1, 75), (1, 88)) at a location of the second memory area 220 appointed by a bucket ID BID (=1).

Then, edge data on straight lines D may be received sequentially. The straight lines D may have the same Y-axis coordinate as edge data of the straight line C, while they may have X-axis coordinates different from the straight line C. Since minimum points of the straight lines D are on the scan line Y75, edge data of the straight lines D must be stored at the same bucket area within the second memory area 220. But, as set forth above, since each bucket area within the second memory area 220 can store only 31 edge data, it is impossible to store the straight lines C and D at the same bucket area within the second memory area 220.

If a count value read from a scan line Y75 of the first memory area 210 is 31, the edge write controller 121 may set a new bucket ID (BID=4) appointing an empty bucket area of the second memory area 220 and increase an edge count ECNT of a field corresponding to the 75th scan line Y75 among fields within the first memory area 210 by 1. The edge write controller 121 may store bucket information Y75 (BID=4, ECNT=32) at a field corresponding to the 75th scan line Y75 among fields within the first memory area 210 and edge data on the 31th straight line D at a location of the second memory area 220 designated by the bucket ID (BID=4). At this time, the edge write controller 121 may set an index IDX at a location of the second memory area 220 appointed by the bucket ID (BID=4) to 1 being a previous bucket ID.

Edge data on the 31th to 62th Straight lines D may be stored at a location of the second memory area 220 appointed by a bucket ID (BID=4) according to the above-described manner.

If a count value read from a scan line Y75 of the first memory area 210 is 62, the edge write controller 121 may set a new bucket ID (BID=6) appointing an empty bucket area of the second memory area 220 and increase an edge count ECNT of a field corresponding to the 75th scan line Y75 among fields within the first memory area 210 by 1. The edge write controller 121 may store bucket information Y75 (BID=6, ECNT=63) at a field corresponding to the 75th scan line Y75 among fields within the first memory area 210 and edge data on the 62th straight line D at a location of the second memory area 220 designated by the bucket ID (BID=6). At this time, the edge write controller 121 may set an index IDX at a location of the second memory area 220 appointed by the bucket ID (BID=6) to 4 being a previous bucket ID.

Edge data on the 63th to 81th Straight lines D may be stored at a location of the second memory area 220 appointed by a bucket ID (BID=6) according to the above-described manner.

Below, an edge read controller 120 in FIG. 2 will be more fully described with reference to accompanying drawings. A rasterizer 130 may output a scan signal (i) for scanning scan lines sequentially. For example, a value of the scan signal (i) may be sequentially changed from 0 to n for sequential scanning from a scan line Y0 to a scan line Yn.

The edge read controller 122 may read bucket information Yi(BID, ECNT) from the first memory area 210 of the memory 200 and edge data EG(S, E) from the second memory area 220 thereof in response to a scan signal (i).

The edge read controller 122 may read bucket information Y0(BID, ECNT) from the first memory area 210 of the memory 200 in response to a scan signal (i=0). In an example illustrated in FIGS. 5A and 5B, an edge count of a field within the first memory area 210 corresponding to a scan line Y0 may be '0'. Therefore, the edge read controller 122 may not access the second memory area 220. Likewise, since edge counts of fields within the first memory area 210 corresponding to scan lines Y1 to Y7 may be '0', the edge read controller 122 may not access the second memory area 220 while the scan signal (i) changes from 1 to 7.

The edge read controller 122 may read bucket information Y8(BID, ECNT) from the first memory area 210 of the memory 200 in response to a scan signal (i=8). In an example illustrated in FIGS. 5A and 5B, a bucket ID BID is 5 and an edge count ECNT is 2. The edge read controller 122 may read edge data EG((5, 8), (27, 30)) and ((EG(35, 40), (45, 8)) from a bucket area appointed by a bucket ID (BID=5) among bucket areas of the second memory areas 220. The edge controller 122 may provide the read edge data EG((5, 8), (27, 30)) and ((EG(35, 40), (45, 8)) to the rasterizer 130. The rasterizer 130 may store the edge data received from the edge read controller 122 in a buffer 131 in FIG. 2.

The edge read controller 122 may read bucket information Y9(BID, ECNT) from the first memory area 210 of the memory 200 in response to a scan signal (i=9). In an example illustrated in FIGS. 5A and 5B, an edge count of a field within the first memory area 210 corresponding to a scan line Y9 may be '0'. Therefore, the edge read controller 122 may not access the second memory area 220. Likewise, since edge counts of fields within the first memory area 210 corresponding to scan lines Y10 to Y74 may be '0', the edge read controller 122 may not access the second memory area 220 while the scan signal (i) changes from 10 to 74.

The edge read controller 122 may read bucket information Y75(BID, ECNT) from the first memory area 210 of the memory 200 in response to a scan signal (i=75). In an example illustrated in FIGS. 5A and 5B, an edge count of a field within the first memory area 210 corresponding to a scan line Y75 may be '82'. In an example of FIG. 5B, a bucket ID BID of the bucket information Y75(BID, ECNT) is 6 and an edge count ECNT thereof is 82. The edge read controller 122 may read edge data from a bucket area appointed by the bucket ID (BID=6) among bucket areas of the second memory area 220. The edge read controller 122 may provide the read edge data to the rasterizer 130. The rasterizer 130 may store edge data received from the edge read controller 122 in the buffer 131. After reading 20 edge data from a location of the second memory area 220 appointed by a bucket ID (BID=6), the edge read controller 122 may read 31 edge data from a location appointed by an index IDX of 4, that is, a bucket ID BID of 4. Further, the edge read controller 122 may read 31 edge data from a location appointed by an index IDX of 1, that is, a bucket ID BID of 1. The edge read controller 122 may provide the read edge data to the rasterizer 130. The rasterizer 130 may store edge data received from the edge read controller 122 in the buffer 131.

As above described, it is possible to improve a speed of reading and writing edge data by writing and reading edge data in and from the second memory area 220 in a reverse way link to list manner.

The edge write controller 121 according to at least one example embodiment may store bucket information Y(BID, ECNT) corresponding to input edge data EG(S, E) in the first memory area 210, and the edge data EG(S, E) may be stored in the second memory area 220. The edge read controller 122 may access the second memory area 220 selectively according to bucket information Y(BID, ECNT) read from the first memory area 210. Therefore, it is unnecessary to access a memory with respect to a scan line not including edge data. This means that a memory bandwidth is reduced.

The rasterizer 130 in FIG. 2 may store invalid edge data of edge information stored in the buffer 131. That is, if Ymax is identical to or more than a valued of (a current scan line+1), the rasterizer 130 may delete edge data stored in the buffer 131. In edge data Y((px1, py1), (px2, py2)), Ymax is py1 when py1>py2 and py2 when py1<py2. Further, the current scan line may be a scan line corresponding to a scan line signal (i). Therefore, a size of the buffer 131 within the rasterizer 130 may be minimized.

Figure 6A:
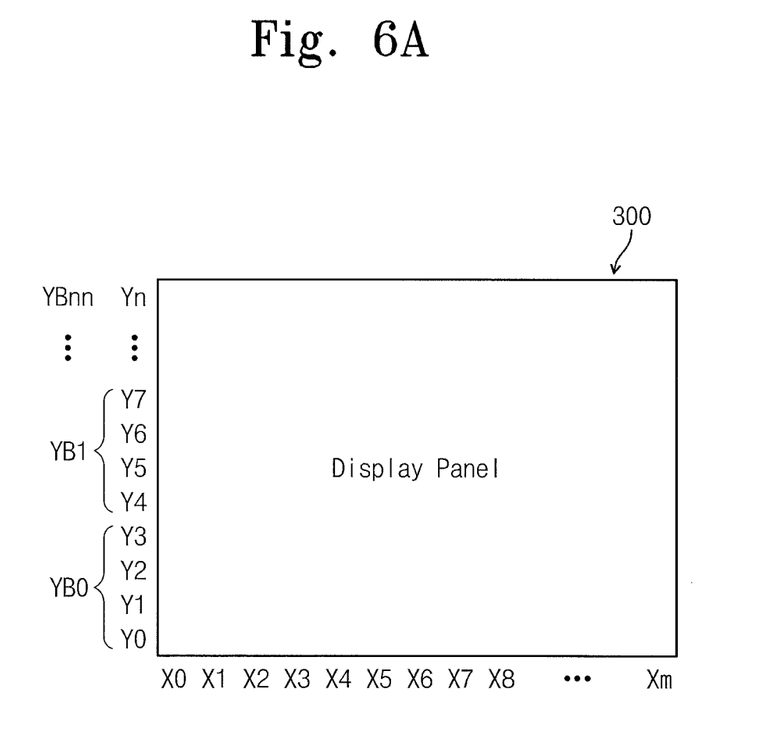
FIG. 6A shows grouping scan lines of a display panel into scan line blocks.
Figure 6B:
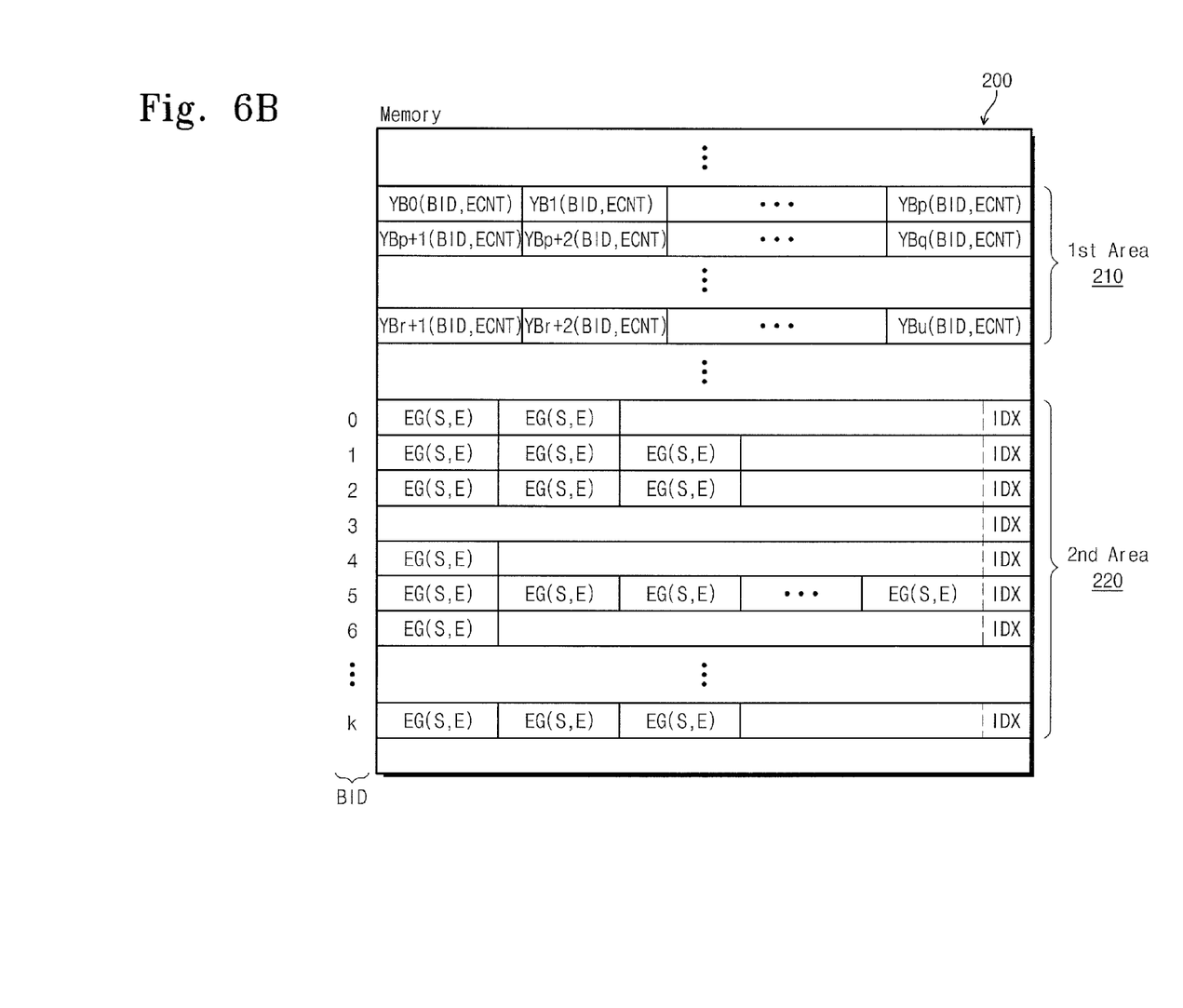
FIG. 6B is a diagram showing correspondence between scan line blocks in FIG. 6A and bucket and edge information stored in a memory.

FIG. 6A shows grouping scan lines of a display panel into scan line blocks, and FIG. 6B is a diagram showing correspondence between scan line blocks in FIG. 6A and bucket and edge information stored in a memory.

Referring to FIG. 6A, a display panel 300 may include (n+1) scan lines Y0 to Yn. For example, four scan lines may constitute one scan line block. That is, scan lines Y0 to Y3 may constitute a scan line block YB0, and scan lines Y4 to Y7 may constitute a scan line block YB1.

Referring to FIG. 6B, a memory 200 may include the first memory area 210 and the second memory area 220. The first memory area 210 of the memory 200 may include a plurality of fields. Fields within the first memory area 210 of the memory 200 may correspond to scan line blocks YB0 to YBm in FIG. 6A, respectively. That is, edge data on one of scan lines Y0 to Y3 within the scan line block YB0 may be stored in the same bucket area within the second memory area 220. Grouping scan lines may enable a space of the memory 200 to be wasted least when image data is relatively simple, that is, the amount of edge data is small.

Figure 7:
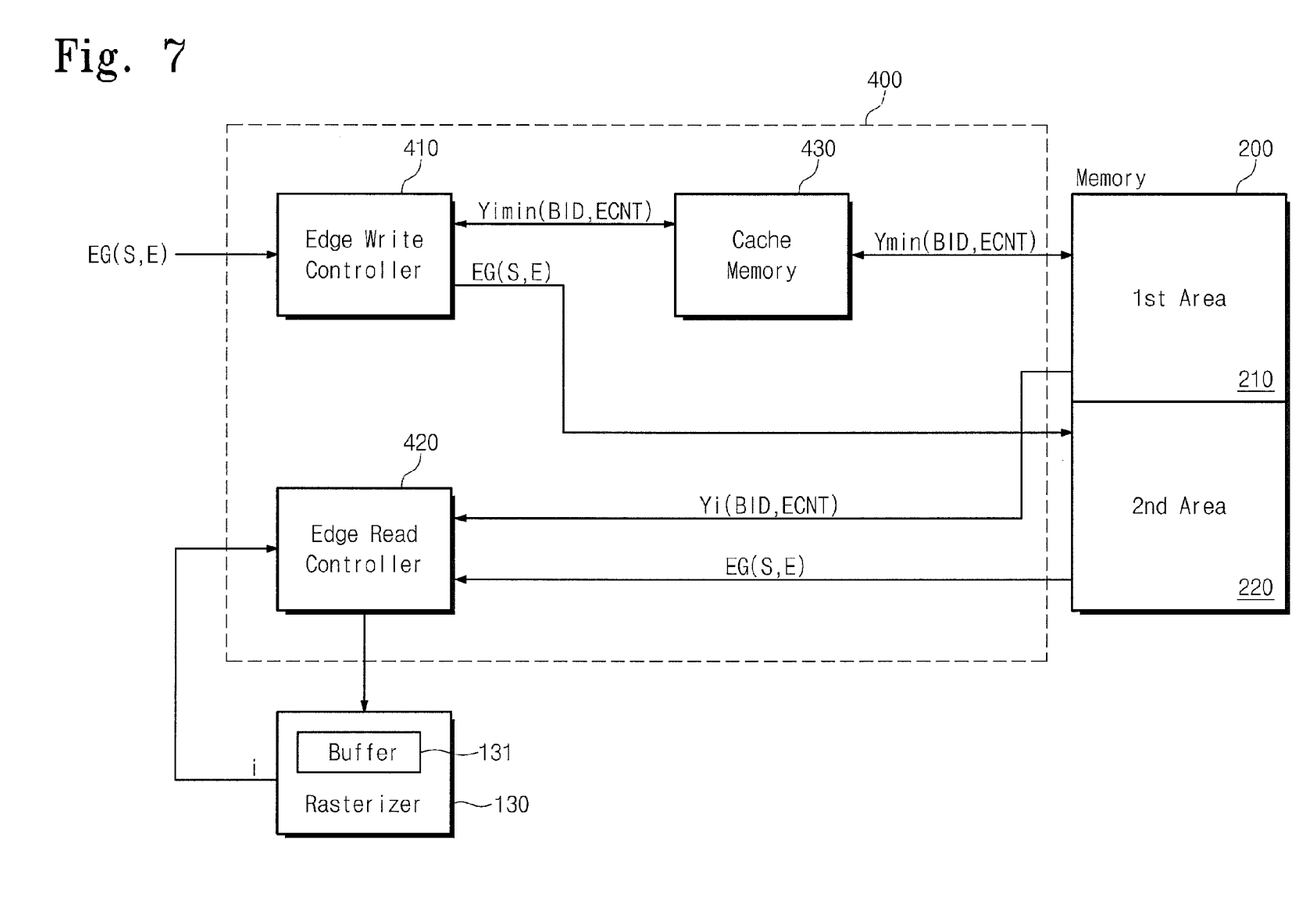
FIG. 7 is a block diagram of an edge management unit according to at least one example embodiment.

FIG. 7 is a block diagram of an edge management unit according to at least one example embodiment.

Referring to FIG. 7, an edge management unit 400 may further include a cache memory 430 unlike an edge management unit 120 in FIG. 2. An edge write controller 410 may receive edge data EG(S, E) from a tessellation and transform unit 110 in FIG. 1 to generate bucket information Ymin(BID, ECNT) corresponding to the edge data EG(S, E). The edge write controller 121 may store the bucket information Ymin (BID, ECNT) in the cache memory 430 and the edge data EG(S, E) at a location of the second memory area 220 of a memory 200 appointed by the bucket information Ymin(BID, ECNT).

The cache memory 430 may be used to reduce a bandwidth of the memory 200 and a time taken for the edge write controller 410 to read and write bucket information Ymin(BID, ECNT) from and in the memory 200. All bucket information stored in the cache memory 430 may be copied back to the first memory area 210 of the memory 200.

Figure 8:
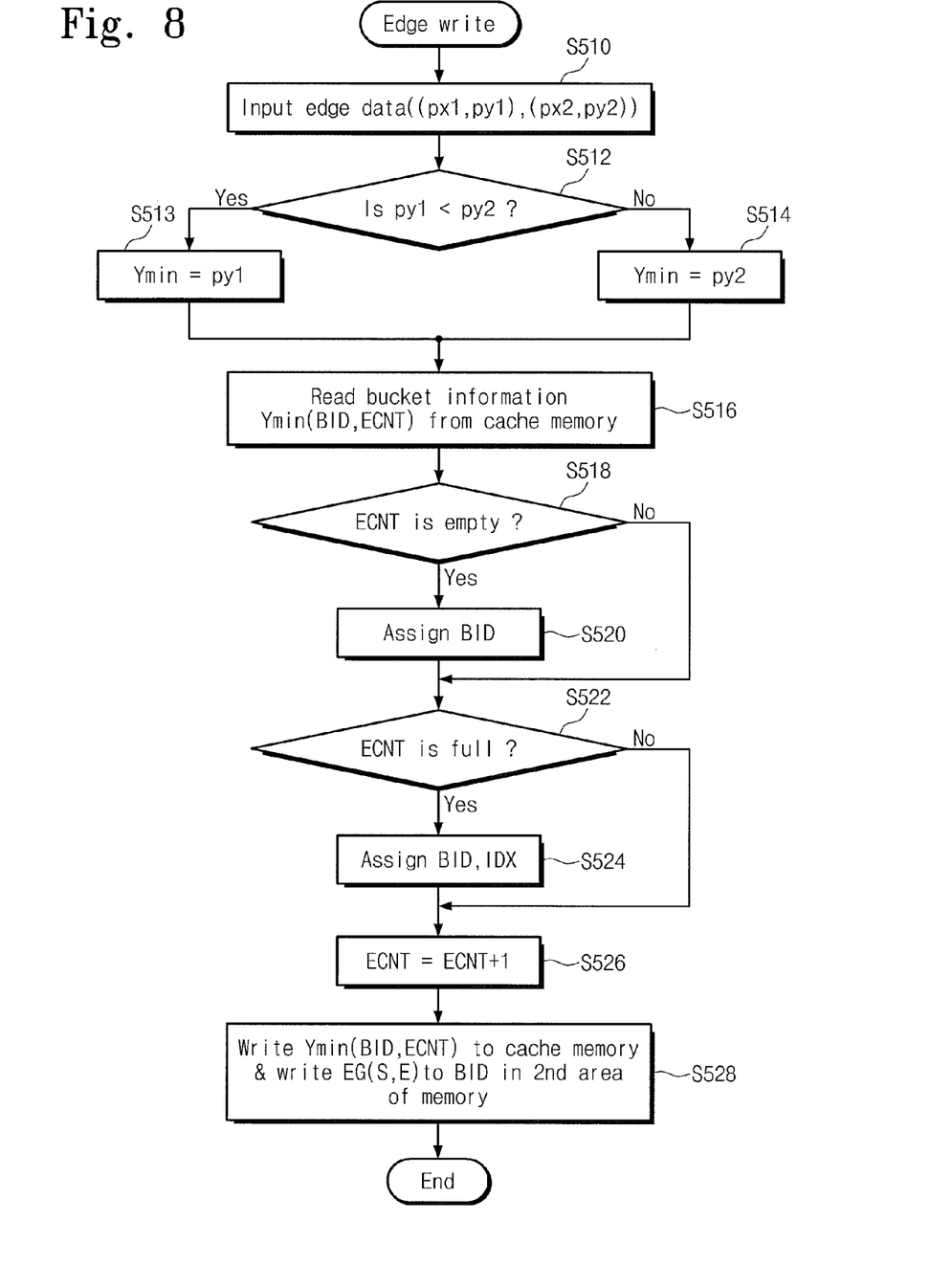
FIG. 8 is a flowchart for describing an operation of an edge write controller in FIG. 7.

FIG. 8 is a flowchart for describing an operation of an edge write controller in FIG. 7.

In operation S510, an edge write controller 410 may read edge data EG(S, E) from a tessellation and transform unit 110. The edge data may include a coordinate ((px1, py1), (px2, py2)) of an edge indicating two points of a straight line.

In operation S512, the edge write controller 410 may search a minimum point Ymin of the edge data EG(S, E). The minimum point Ymin may be py1 when py1<py2 (S513). The minimum point Ymin may be py2 when py1 is not <py2 (S514).

In operation S516, the edge write controller 410 may read bucket information Ymin(BID, ENCT) from a cache memory 430. In case of cache hit, the cache memory 430 may provide the bucket information Ymin(BID, ENCT) to the edge write controller 410. In case of cache miss, the cache memory 430 may fetch the bucket information Ymin(BID, ENCT) from the first memory area 210 to provide it to the edge write controller 410.

In operation S518, the edge write controller 410 may judge whether an edge count ECNT of the bucket information Ymin (BID, ENCT) read from the cache memory 430 is '0'. If the edge count ECNT is '0', in operation S520, the edge write controller 410 may assign a new bucket ID BID indicating a location of the second memory area 220 where the edge data EG(S, E) is to be stored.

In operation S522, the edge write controller 410 may judge whether the edge count ECNT of the bucket information Ymin(BID, ENCT) read from the cache memory 430 has a predetermined value. If the number of edge data capable of being stored at a location of the second memory area 220 appointed by a bucket ID is L, the predetermined value may be a multiple of L. For example, if the number of edge data capable of being stored at a location of the second memory area 220 appointed by a bucket ID is 31, the predetermined value may be set sequentially to 31, 62, 93, and so on.

If the edge count ECNT is the predetermined value, in operation S524, the edge write controller 410 may assign a new bucket ID BID indicating a location of the second memory area 220 in which edge data EG(S, E) is to be stored. Further, the edge write controller 410 may set an index IDX to a previous bucket ID BID.

In operation S526, the edge write controller 410 may increase the edge count ECNT by 1. In operation S528, the edge write controller 410 may write the edge information Ymin(BID, ECNT) in the cache memory 430 and the edge data EG(S, E) at a location, appointed by a bucket ID BID, of the second memory area 220.

Figure 9:
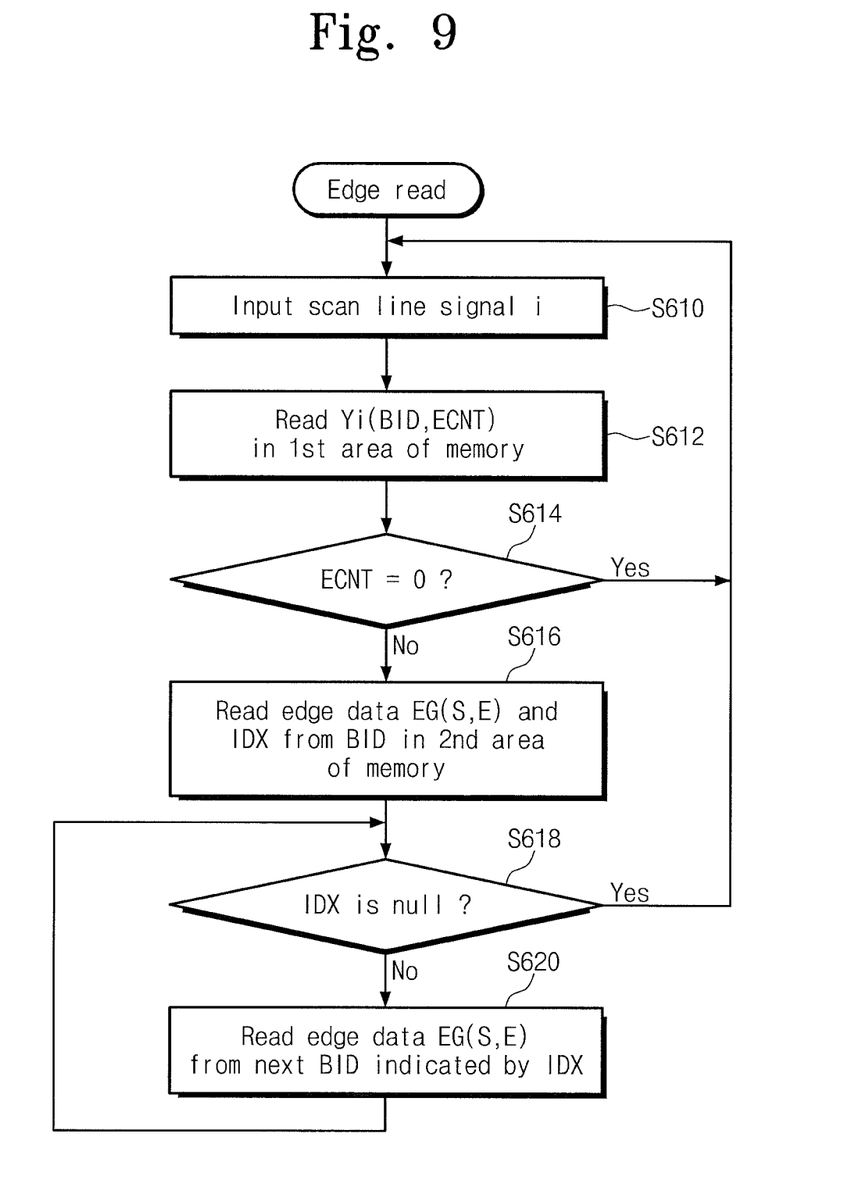
FIG. 9 is a flowchart for describing an operation of an edge read controller in FIG. 7.

FIG. 9 is a flowchart for describing an operation of an edge read controller in FIG. 7.

Referring to FIG. 9, in operation S610, an edge read controller 420 may receive a scan line signal (i) from a rasterizer 130. In operation 612, the edge read controller 420 may read bucket information Yi(BID, ECNT) corresponding to the scan line signal (i) from the first memory area 210 of a memory 200. In operation S614, the edge read controller 420 may judge whether the read edge count ECNT is '0'. That the read edge count ECNT is '0' may mean that no edge data exists on the ith scan line. Therefore, the edge read controller 420 may not access the second memory area 220 of the memory 200. That is, if the read edge count ECNT is judged to be '0', the method proceeds to operation S610.

If the edge count is judged not to be '0', in operation S616, the edge read controller 420 may read edge data EG(S, E) and an index IDX from a bucket area, appointed by the read bucket ID BID, among bucket areas within the second memory area 220 of the memory 200. The read edge data EG(S, E) may be provided to a rasterizer 130.

In operation S618, the edge read controller 420 may judge whether the index IDX has a valid value. If the index IDX is null data or a predetermined invalid value, the method proceeds to operation S610. If the index IDX is judged to be valid, in operation S620, the edge read controller 420 may read edge data EG(S, E) from a location of the second memory area 220 appointed by the index IDX. The edge data EG(S, E) read by the edge read controller 420 may be provided to the rasterizer 130. The operations S618 and S620 may be repeated until stored edge data is all read in the reverse link to list manner.

With above described, it is possible to reduce a memory bandwidth when edge data of the 2-dimension vector graphics is written or read in or from a memory. Therefore, the performance of an image processing apparatus may be improved.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An edge management method comprising: receiving edge data indicating the coordinates of an edge having a first endpoint with a first scan line coordinate and a second endpoint with a second scan line coordinate higher that the first scan line coordinate;
   determining a minimum scan line coordinate of the edge;
   reading, from a first memory area, a bucket information entry corresponding to the determined minimum scan line coordinate, the read bucket information entry including,
   a first bucket identifier (ID) that identifies a first bucket area in a second memory, and
   an edge count that identifies a number of edges stored in the first bucket area;
   performing a comparison operation based on the edge count and a reference value, the reference value being greater than 1;
   when the comparison operation indicates that the edge count does not equal the reference value,
   writing the edge in the first bucket area of the second memory; and
   when the comparison operation indicates that the edge count does equal the reference value,
   assigning a second bucket ID that identifies a second bucket area in the second memory,
   assigning an index that identifies the first bucket area, and
   writing the edge and the index in the second bucket area of the second memory.

2. The edge management method of claim 1, further comprising:
   receiving a scan line signal;
   reading a bucket ID and an edge count corresponding to the scan line signal from the first memory; and
   reading the edge data from a location of the second memory when the edge count indicates at least one edge, the location from which the edge data is read being a bucket area identified by the bucket ID that corresponds to the scan line signal.

3. An edge management unit configured to control storage, in a memory unit, of edge data including a plurality of edges of a first scan line, comprising:
   a writing unit configured to,
      receive edge data indicating the coordinates of an edge having a first endpoint with a first scan line coordinate and a second endpoint with a second scan line coordinate higher that the first scan line coordinate,
      determine a minimum scan line coordinate of the edge,
      read, from a first memory area, a bucket information entry corresponding to the determined minimum scan line coordinate, the read bucket information entry including,
         a first bucket identifier (ID) that identifies a first bucket area in a second memory, and
         an edge count that identifies a number of edges stored in the first bucket area,
      perform a comparison operation based on the edge count and a reference value, the reference value being greater than 1,
      when the comparison operation indicates that the edge count does not equal the reference value,
         write the edge in the first bucket area of the second memory, and
      when the comparison operation indicates that the edge count does equal the reference value,
         assign a second bucket ID that identifies a second bucket area in the second memory,
         assign an index that identifies the first bucket area, and
         write the edge and the index in the second bucket area of the second memory.

* * * * *